United States Patent [19]

Williams

[11] Patent Number: 5,213,353
[45] Date of Patent: May 25, 1993

[54] TRUCK TRAILER STEERING APPARATUS

[76] Inventor: Herbert F. Williams, 720-695 Alexander La., Standish, Calif. 96128

[21] Appl. No.: 808,213

[22] Filed: Dec. 16, 1991

[51] Int. Cl.$^5$ ............................................. B62D 13/02
[52] U.S. Cl. ....................................... 280/426; 280/97; 280/130; 280/400; 280/442
[58] Field of Search ....................... 280/426, 442, 400; 180/235, 14.1; 200/97, 130

[56] References Cited

U.S. PATENT DOCUMENTS 5,035,439  7/1991  Petrillo ................................ 280/426

FOREIGN PATENT DOCUMENTS

| | | | |
|---|---|---|---|
| 924915 | 3/1955 | Fed. Rep. of Germany | 280/442 |
| 489571 | 1/1954 | Italy | 280/442 |
| 254432 | 12/1948 | Switzerland | 280/130 |
| 1507635 | 9/1989 | U.S.S.R. | 280/442 |
| 2161438 | 1/1986 | United Kingdom | 280/426 |

Primary Examiner—Mitchell J. Hill
Attorney, Agent, or Firm—Leon Gilden

[57] ABSTRACT

An apparatus mounted to a bottom wall of a trailer member mounting the trailer differential housing thereto to permit rotation of the housing to effect four-wheel steering relative to a tractor truck member mounted to the trailer. A mounting plate pivotally mounts a pivot plate, with a drive motor arranged in operative association to rotate the pivot plate relative to the drive plate, with the motor mounted to the mounting plate.

4 Claims, 5 Drawing Sheets

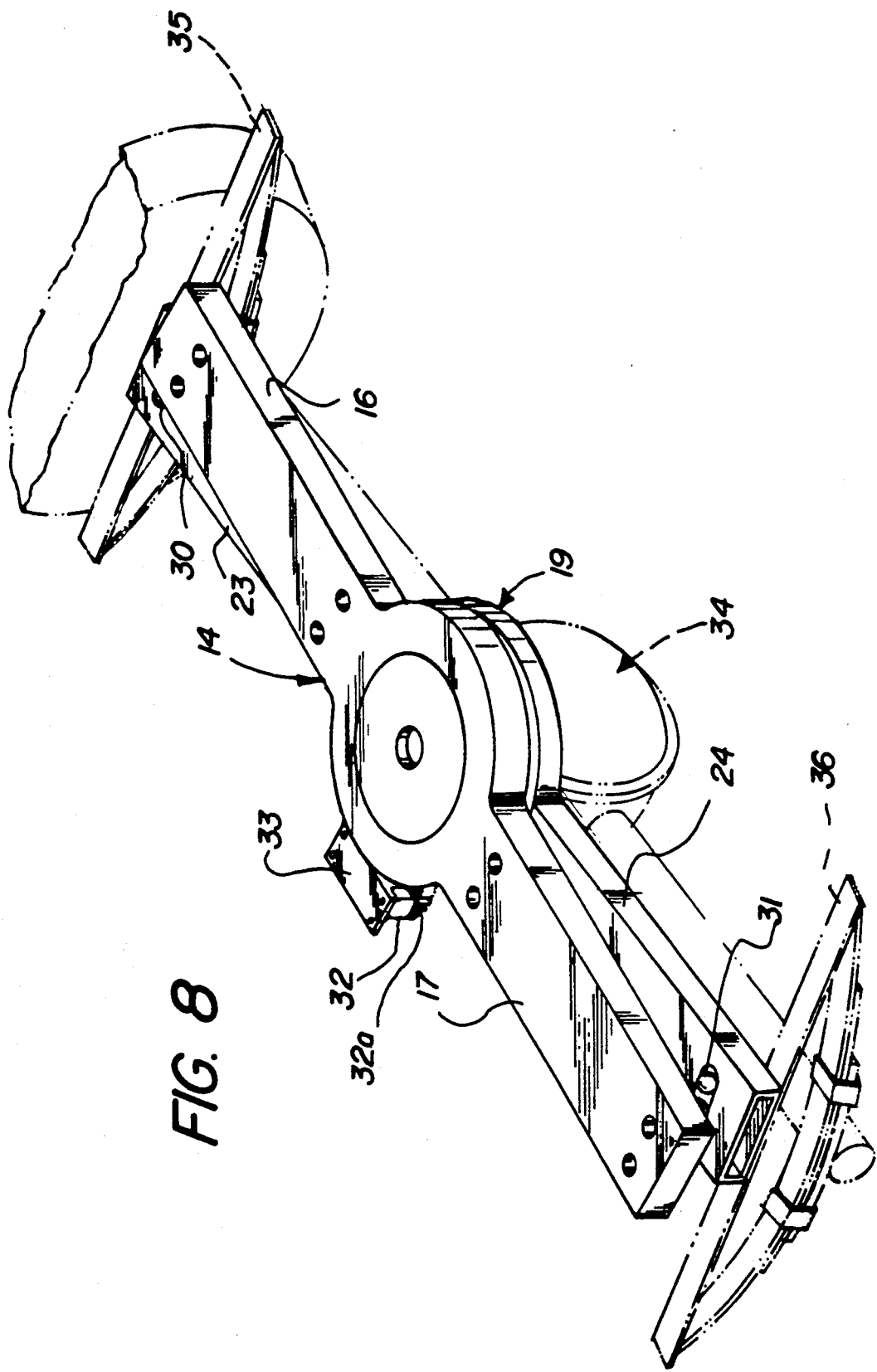

TRUCK TRAILER STEERING APPARATUS

BACKGROUND OF THE INVENTION

1. Field of the Invention

The field of invention relates to trailer steering apparatus, and more particularly pertains to a new and improved truck trailer steering apparatus wherein the same is arranged to enhance ease of maneuverability of a trailer relative to a tractor truck structure.

2. Description of the Prior Art

Four-wheel steering apparatus of various types has been utilized in the prior art to enhance ease of steering of an associated self-propelled vehicle. Such steering is exemplified in U.S. Pat. No. 4,966,246 to Janson, et al. utilizing linkage members operatively mounted to the rear wheels of a vehicle to manipulate the rear wheels in a steering procedure.

U.S. Pat. No. 4,955,443 to Bausch sets forth a motor vehicle formed with four-wheel steering utilizing an electrically operative steering box member arranged to manipulate a rear steering assembly of a vehicle.

U.S. Pat. No. 4,958,698 to Kirschner and U.S. Pat. No. 4,930,592 to Ohmura set forth further examples of linkage arrangements mounted to rear portions of a vehicle to effect four-wheel steering of the vehicle.

As such, it may be appreciated that there continues to be a need for a new and improved truck trailer steering apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of steering apparatus now present in the prior art, the present invention provides a truck trailer steering apparatus wherein the same is arranged to permit rotation of a trailer rear housing to provide ease of manipulation of the rear housing in rotation of the associated wheels rotatably mounted thereto. As such, the general purpose of the present invention, which will be described subsequently in greater detail, is to provide a new and improved truck trailer steering apparatus which has all the advantages of the prior art steering apparatus and none of the disadvantages.

To attain this, the present invention provides an apparatus mounted to a bottom wall of a trailer member mounting the trailer differential housing thereto to permit rotation of the housing to effect four-wheel steering relative to a tractor truck member mounted to the trailer. A mounting plate pivotally mounts a pivot plate, with a drive motor arranged in operative association to rotate the pivot plate relative to the drive plate, with the motor mounted to the mounting plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck trailer steering apparatus which has all the advantages of the prior art steering apparatus and none of the disadvantages.

It is another object of the present invention to provide a new and improved truck trailer steering apparatus which may be easily and efficiently manufactured and marketed.

It is a further object of the present invention to provide a new and improved truck trailer steering apparatus which is of a durable and reliable construction.

An even further object of the present invention is to provide a new and improved truck trailer steering apparatus which is susceptible of a low cost of manufacture with regard to both materials and labor, and which accordingly is then susceptible of low prices of sale to the consuming public, thereby making such truck trailer steering apparatus economically available to the buying public.

Still yet another object of the present invention is to provide a new and improved truck trailer steering apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an isometric illustration of the pivot plate and mounting plate relative to the trailer structure.

DESCRIPTION OF THE PREFERRED EMBODIMENT

Figure 1:
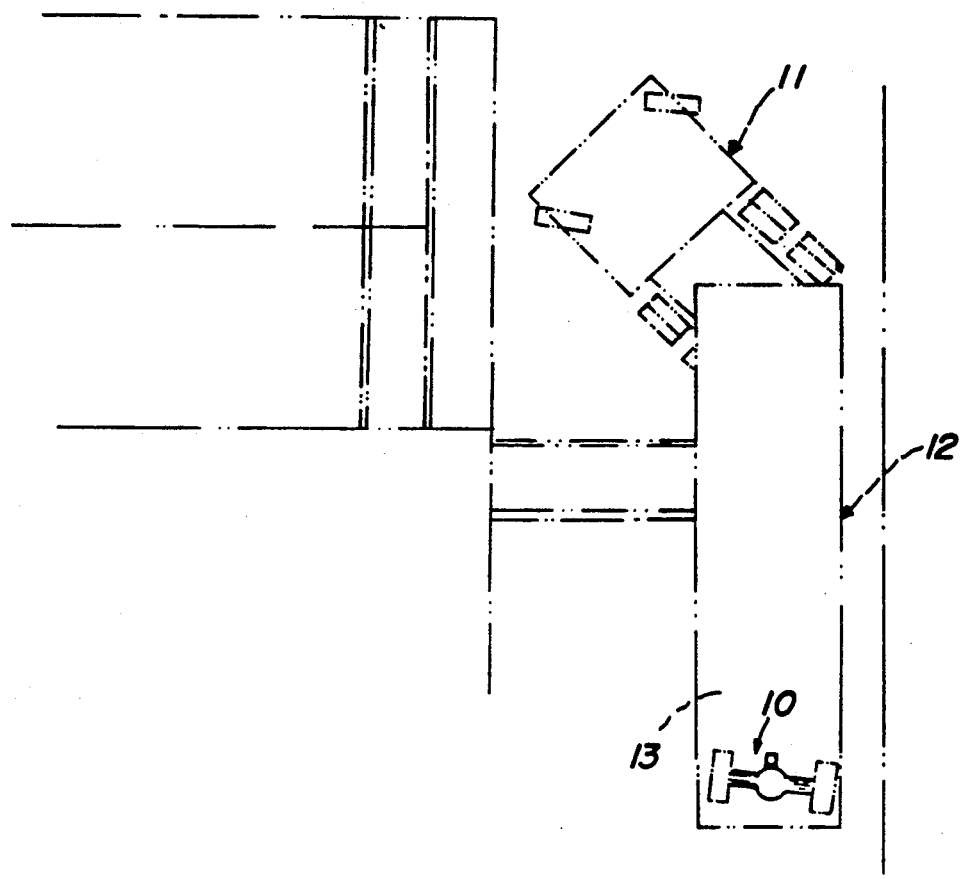
FIG. 1 is an orthographic top view of a conventional truck trailer arrangement utilizing the steering apparatus of the instant invention.

With reference now to the drawings, and in particular to FIGS. 1 to 8 thereof, a new and improved truck trailer steering apparatus embodying the principles and concepts of the present invention and generally designated by the reference numeral 10 will be described.

More specifically, the truck trailer steering apparatus 10 of the instant invention essentially comprises the apparatus mounted relative to a trailer assembly 12 formed with a trailer floor 13 defined by parallel side edges. A tractor truck member 11 pivotally mounted to a forward end of the trailer assembly 12 is arranged for the transport of the trailer during use. A mounting plate 14 is mounted to the floor 13 to an exterior surface thereof of the trailer assembly 12 that includes a mounting plate central hub 15. A mounting plate first wing 16 and a mounting plate second wing 17 that are linearly aligned relative to one another mounted on diametrically opposed sides of the central hub 15 are fixedly mounted to the trailer floor 13 orthogonally oriented relative to the side edges 12 of the trailer assembly 12. Trailer floor mounting bores 18 directed through the wings 16 and 17 receive fasteners (not shown) for securement of the mounting plate 14 to the trailer floor 13.

A pivot plate 19 includes a pivot plate central hub 20 coaxially aligned below the mounting plate central hub 15, with the pivot plate 19 including an array of parallel gear teeth 21 mounted to an exterior surface of the pivot plate central hub 20 about a pivot plate central hub arcuate forward face 22 extending between a pivot plate first wing 23 and a pivot plate second wing 24 that are mounted to diametrically opposed sides of the pivot plate central hub 20 and are linearly aligned relative to one another. A pivot axle 25 coaxially directed through the mounting plate central hub 15 and the pivot plate central hub 20 permits pivotment of the pivot plate 19 relative to the mounting plate 14.

A circular array of bearings 26 mounted to a top surface of the pivot plate central hub 20 coaxially of the pivot axle 25 is arranged to project above the pivot plate central hub 20 from within a circular central groove 27. First wing trough 28 and second wing trough 29 include respective first and second bearings 30 and 31 projecting above the top surface of the pivot plate 19 that is coplanar and arranged in a parallel relationship relative to a coplanar surface or a bottom surface of the mounting plate 14. The bearings ease relative rotation of the pivot plate relative to the mounting plate in use.

Figure 2:
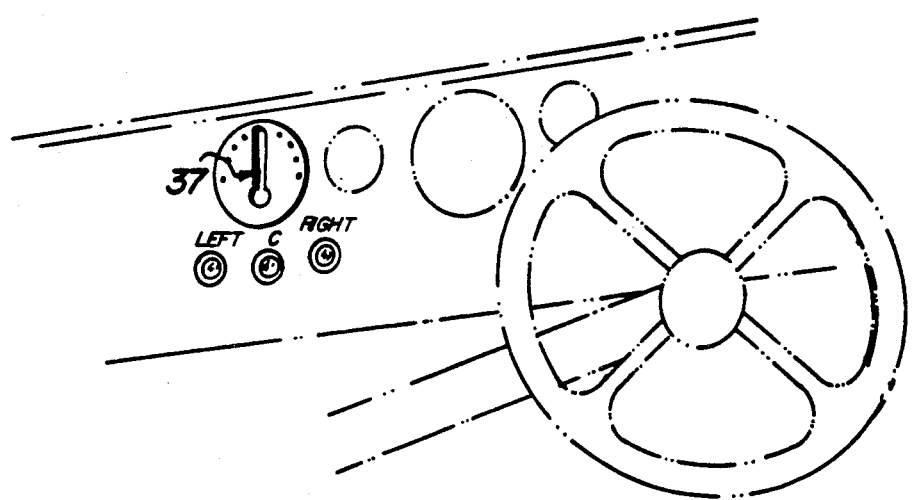
FIG. 2 is an isometric illustration of a vehicle passenger compartment illustrating a typical control for use with the instant invention.
Figure 3:
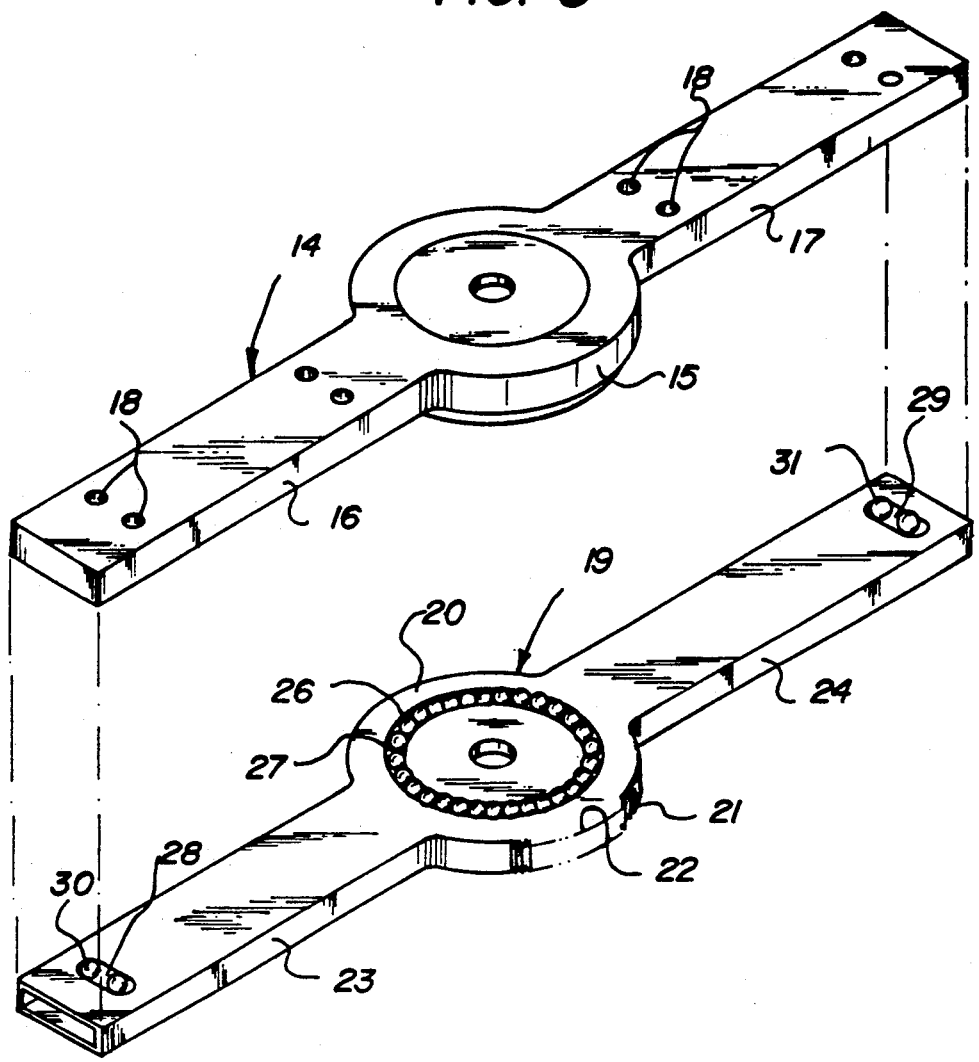
FIG. 3 is an isometric exploded illustration of the mounting plate and fluid plate utilized by the invention.
Figure 4:
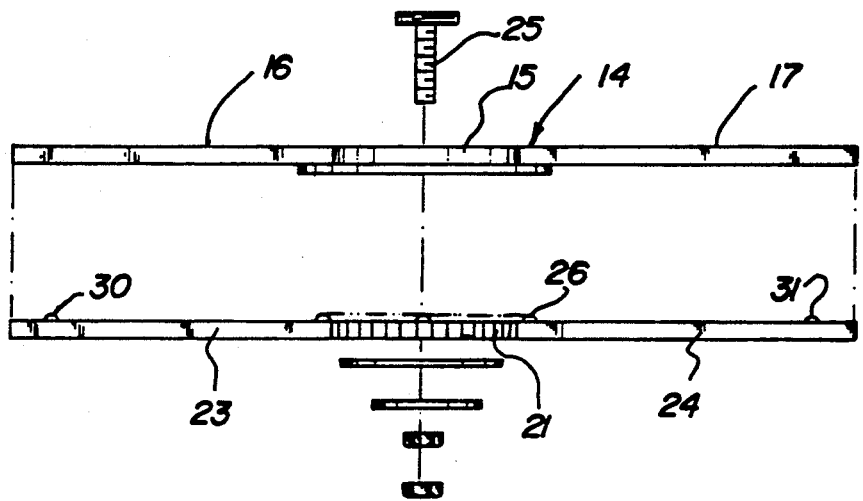
FIG. 4 is an orthographic view, taken in elevation, of the pivot plate and mounting plate of the invention.
Figure 5:
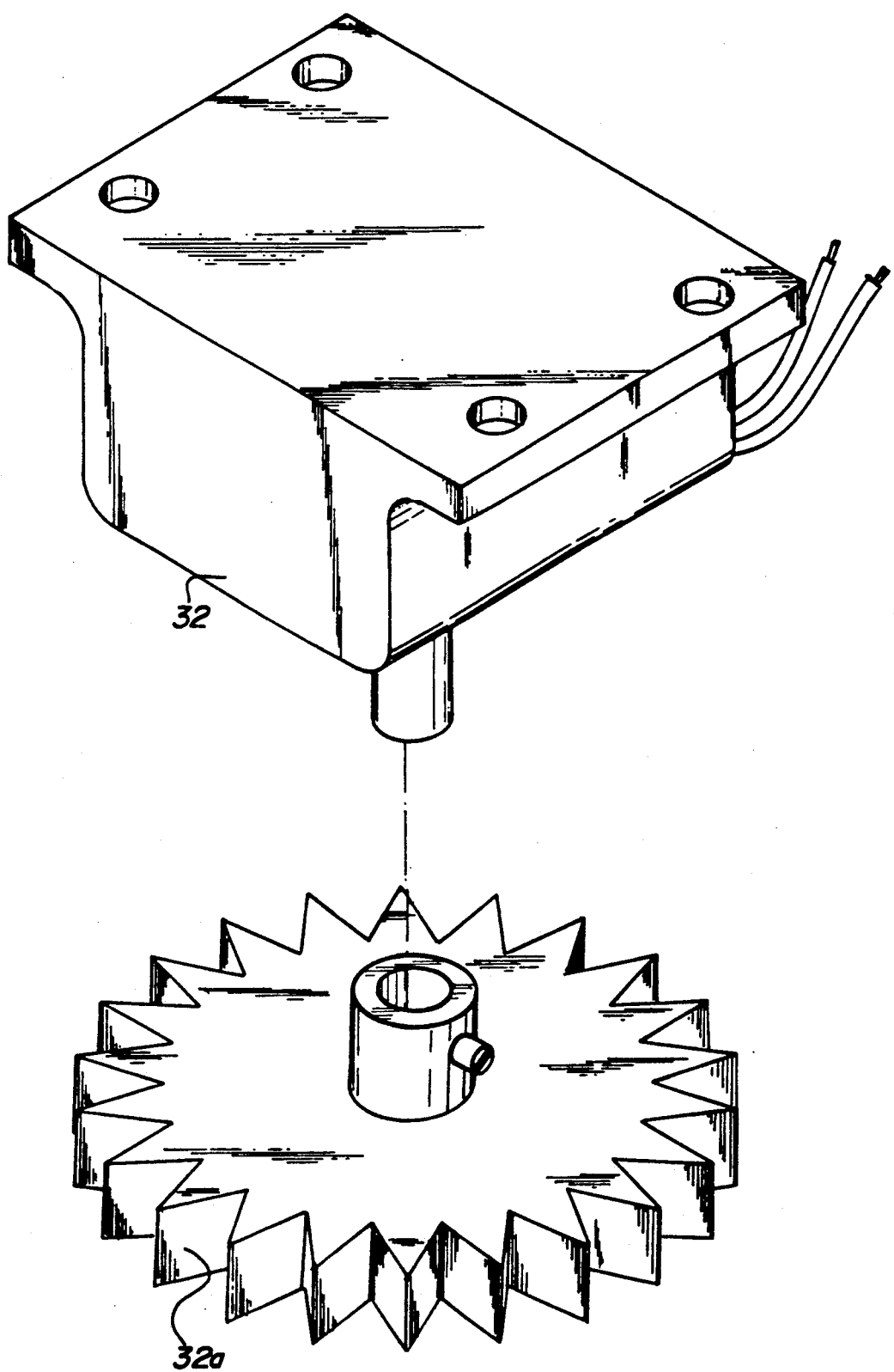
FIG. 5 is an isometric illustration of the drive motor of the instant invention.
Figure 6:
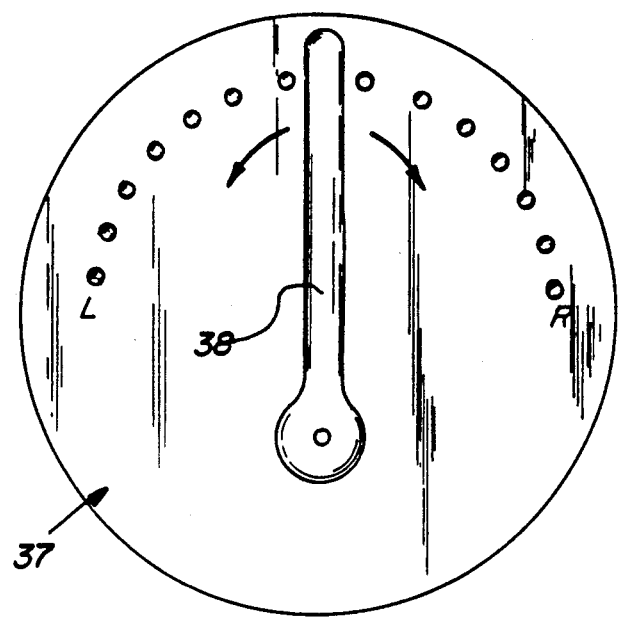
FIG. 6 is an orthographic enlarged view of the selector dial structure utilized by the invention.
Figure 7:
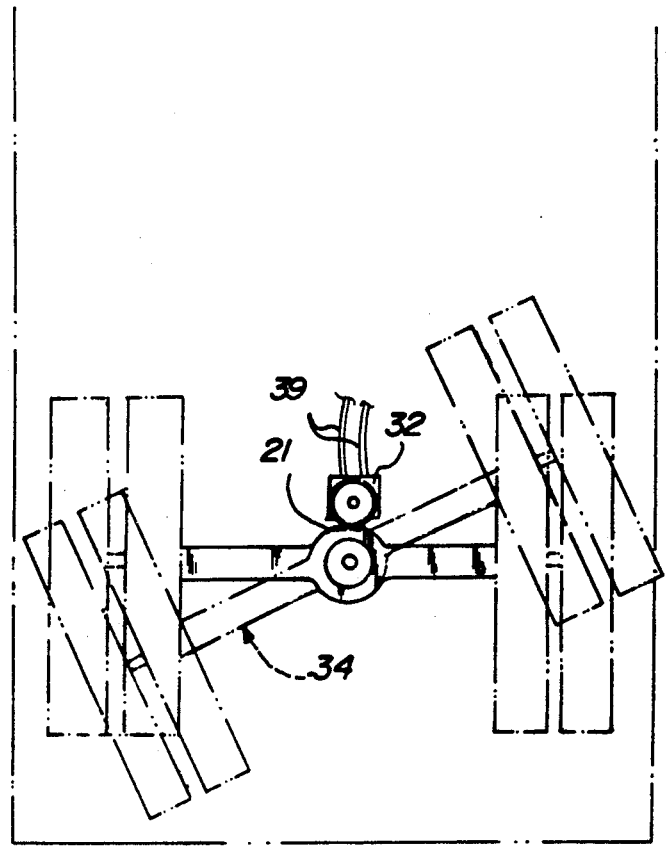
FIG. 7 is an orthographic enlarged view of the invention mounted to the trailer floor.

A drive motor 32 is fixedly mounted to a mounting flange 33 that in turn is fixedly mounted to the mounting plate central hub 14. The drive motor 32 includes a drive motor drive gear 32a arranged in operative communication with the parallel gear teeth 21 of the pivot plate central hub 20. As may be appreciated, rotation of the drive gear 32a by the drive motor 32 effects relative rotation of the pivot plate 19 relative to the mounting plate 14. The pivot plate 19 accordingly includes a rear housing 34 positioned below and fixedly mounted to the pivot plate 19 fixedly mounted thereto, as well as a housing first spring 35 and a housing second spring 36 orthogonally oriented relative to opposed distal ends of the respective first and second wings 23 and 24. The vehicular wheels, such as illustrated in the FIGS. 1 and 7, are in turn rotatably mounted to the housing 34 extending exteriorly of the housing in a conventional manner. A selector dial 37 mounted to an interior passenger compartment of the vehicle, as illustrated in FIG. 2, includes a selector arm 38 in operative association with the drive motor 32 by means of the electrical lines 39 to effect rotation of the drive motor in a clockwise or counter-clockwise manner effecting pivotment of the pivot plate 19 relative to the mounting plate 14. The selector dial 37 functions as a switch in a conventional D.C. circuit to effect rotation of the reversal drive motor 32 of the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck trailer steering apparatus mounted to a trailer assembly, wherein the trailer assembly includes a trailer floor, the trailer floor defined by parallel side edges, and a mounting plate fixedly secured to the floor, wherein the mounting plate includes a mounting plate central hub and a mounting plate first wing colinearly aligned with a mounting plate second wing, wherein the first wing and the second wing are mounted on diametrically opposed sides of the central hub, and the first wing and the second wing are orthogonally oriented relative to the parallel side edges of the trailer floor, and a pivot plate including a pivot plate central hub, the pivot plate central hub coaxially aligned relative to the mounting plate central hub, including a pivot axle coaxially directed through the pivot plate central hub and the mounting plate central hub to permit pivotment of the pivot plate central hub relative to the mounting plate central hub, and a pivot plate first wing and a pivot plate second wing fixedly mounted to the pivot plate central hub on diametrically opposed sides of the pivot plate central hub, and the pivot plate first wing and the pivot plate second wing are colinearly aligned relative to one another, and a rear housing mounted to a bottom surface of the pivot plate central hub below the mounting plate, wherein the rear housing includes wheel members rotatably mounted to the rear housing, and drive means for rotating the pivot plate relative to the mounting plate.

2. An apparatus as set forth in claim 1 wherein the drive means are mounted to the mounting plate central hub.

3. An apparatus as set forth in claim 2 wherein the drive means includes a drive motor fixedly mounted to a drive motor flange, the drive motor flange fixedly mounted to the mounting plate central hub, and the pivot plate central hub includes an array of parallel gear teeth extending coextensively between the first wing and the second wing to an arcuate forward face of the pivot plate central hub, and the drive motor including a drive gear in operative communication with the parallel gear teeth, whereupon rotation of the drive gear effects pivotment of the pivot plate relative to the mounting plate.

4. An apparatus as set forth in claim 3 including a circular central groove formed within the pivot plate central hub in confrontation with the mounting plate central hub, and a circular array of bearings positioned within the circular central groove, wherein the circular array of bearings project above the pivot plate central hub for rotative communication with the mounting plate, and the pivot plate first wing includes a first wing trough, and the pivot plate second wing includes a second wing trough, wherein the first wing trough and the second wing trough include respective first wing bearings and second wing bearings contained therewithin, wherein the first wing bearings and the second wing bearings project above the respective first wing and second wing in communication with the mounting plate first wing and second wing to ease pivotment of the pivot plate first wing relative to the mounting plate first wing and the pivot plate second wing relative to the mounting plate second wing.

* * * * *